US011290285B2

(12) United States Patent
Nelluri et al.

(10) Patent No.: US 11,290,285 B2
(45) Date of Patent: Mar. 29, 2022

(54) CENTRALIZED IDENTIFICATION FOR CERTIFICATE USING NATURAL LANGUAGE PROCESSING

(71) Applicant: Bank of America Corporation, Charlotte, NC (US)

(72) Inventors: Govinda Rajulu Nelluri, Telangana (IN); Srinivasa Rao Dakshinyam, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 616 days.

(21) Appl. No.: 16/270,999

(22) Filed: Feb. 8, 2019

(65) Prior Publication Data
US 2020/0259669 A1 Aug. 13, 2020

(51) Int. Cl.
*H04L 9/32* (2006.01)
*G06F 16/22* (2019.01)

(52) U.S. Cl.
CPC ............ *H04L 9/3268* (2013.01); *G06F 16/22* (2019.01)

(58) Field of Classification Search
CPC .................................................. H04L 9/3268
See application file for complete search history.

(56) References Cited

U.S. PATENT DOCUMENTS

| 6,138,088 A | 10/2000 | Goeser |
| 7,039,805 B1 | 5/2006 | Messing |
| 7,406,599 B1 | 7/2008 | Pravetz et al. |
| 9,369,488 B2 | 6/2016 | Woods et al. |
| 9,379,897 B1 | 6/2016 | Beaty et al. |
| 9,935,777 B2 | 4/2018 | Saxena et al. |
| 2011/0004763 A1* | 1/2011 | Sato ...................... H04L 63/06 713/175 |
| 2018/0219857 A1* | 8/2018 | Bhattacharya ...... H04L 63/0442 |
| 2019/0089546 A1* | 3/2019 | Garcia Morchon .. H04L 9/0847 |

* cited by examiner

*Primary Examiner* — Esther B. Henderson

(57) ABSTRACT

A certificate identification system comprises multiple source devices configured to generate an artifact which comprises features indicating user data and an action, a certificate database configured to store certificates comprising user identity information corresponds to its signatory, and an identity manager in signal communication with the source devices and the certificate database. The identity manager is configured to receive the artifact from a source device of the source devices; identify the features in the artifact using natural language processing; determine a signatory based on the identified features in the artifact; retrieve a certificate corresponding to the signatory from the certificate database; compare the identified features in the artifact with the user identity information which corresponds to the signatory comprised in the retrieved certificate; identify that the identified features in the artifact match the user identity information comprised in the retrieved certificate; and attach the retrieved certificate to the artifact.

20 Claims, 4 Drawing Sheets

```
                                               ┌─ 104a
BANK NAME,
Please initiate a ┊fund transfer┊on my behalf with
the following details.         └── 204 Action From:
┌──────────────────────────────┐
│ Customer Account Number      │
│ Customer First Name          │
│ Customer Last Name           │─── 202a User data
│ IBAN Number                  │
│ Swift Code                   │
└──────────────────────────────┘

To:
┌──────────────────────────────┐
│ Beneficiary Account Number   │
│ Beneficiary First Name       │
│ Beneficiary Last Name        │─── 202b User data
│ Beneficiary IBAN Number      │
│ Swift Code                   │
└──────────────────────────────┘

Thanks,
┌──────────────────┐
│ Handwritten Name │─── 206 Signatory
└──────────────────┘
```

*FIG. 2*

CENTRALIZED IDENTIFICATION FOR CERTIFICATE USING NATURAL LANGUAGE PROCESSING

TECHNICAL FIELD

The present disclosure relates generally to a centralized certificate identification system, and more specifically to a centralized identification for certificate using natural language processing.

BACKGROUND

Many online transactions or digital documents require a digital certificate attached to these transactions or documents to confirm that they come from a valid owner or issuer. With an increasing number of documents required to be attached with a digital certificate, the accuracy for a product processor to identify a correct certificate has been challenged. In addition, various types of the documents, such as images and PDFs, are creating difficulties to identify a correct certificate.

SUMMARY

An institution relies on multiple product processors at its source devices to process an identification and attachment of a certificate for each document received or generated by the source device. These documents processed by the product processor based on a request or a default setting are called an artifact. The product processor further retrieves a corresponding certificate from a certificate database for the artifact and attaches the corresponding certificate to the artifact, so that the artifact may be properly attested. However, due to a higher demand of the artifacts generated at the product processors and an absence of a proper mechanism to attest a certificate, identifying and attaching a correct certificate for an artifact becomes a challenge to the institution. Furthermore, when the institution makes a change to the format of the document or the signatory to an artifact, it creates a heavy loading to a product processor to update the change every single time it generates an artifact. For example, if the institution recently launched a new format of a document for generating an artifact, the institution needs to update all the source devices to account for the new format of the document, so that the source device may use the latest document format to generate the artifact. However, this operation for each change may cause an impact on the performance of the product processor at the source device, which increases the risk to generate a correct artifact and further has trouble to fetch a correct, corresponding digital certificate to be attached to the artifact.

The system disclosed herein provides several technical advantages which include a centralized identity manager to identify a certificate for each artifact received from the source device, where the centralized identity manager comprises a database which is constantly updated with the latest user information related to the artifact and stores the user information. Using a centralized identity manager is an unconventional technique which provides an efficient, high-performance method to identify the artifact using natural language processing and to retrieve its corresponding certificate, and further uses a centralized database to store user information related to the artifact and actions.

In addition, the centralized identity manager may increase the security to avoid the attackers from compromising data in the certificate database directly from the source device. The system disclosed herein facilitates increasing the efficiency for retrieving and attaching a correct certificate to the artifact, updating the formality of the artifact or the user information in the certificate for the source devices, reducing the response time of the disclosed system, and conserving computing resources and network resources. Furthermore, the system disclosed herein further attests the retrieved certificate to improve the security of each transaction. The system may comprise an attester that verifies the retrieved certificate tore-confirm that the retrieved certificate corresponds to the signatory of the artifact and encrypts the retrieved certificate using a private key of the attester.

Unlike methods to retrieve and attach the certificate by each product processor at the source device, where a loading of the operation may compromise the performance of the product processor and increase the difficulty to retrieve a correct certificate, the identity manager disclosed herein may comprise an identification engine to collectively identify assorted artifacts from the source devices using natural language processing, to offer a better performance and efficiency of the system. The identity manager disclosed herein may further comprise an internal database to verify and update the information in the artifact including the format of the artifact and the information of the signatory. An additional attester disclosed herein may re-confirm the information in the retrieved certificate when attaching the retrieved certificate and improve the security of the artifact.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 is an embodiment of an example artifact generated by the source device with a signatory, in accordance with certain embodiments;

DETAILED DESCRIPTION

The system disclosed herein provides several technical advantages which include 1) a centralized identity manager to identify a digital certificate for its corresponding artifact for multiple source devices, and 2) a centralized database to maintain the most updated user information and the latest format requirements to each artifact.

Figure 1:
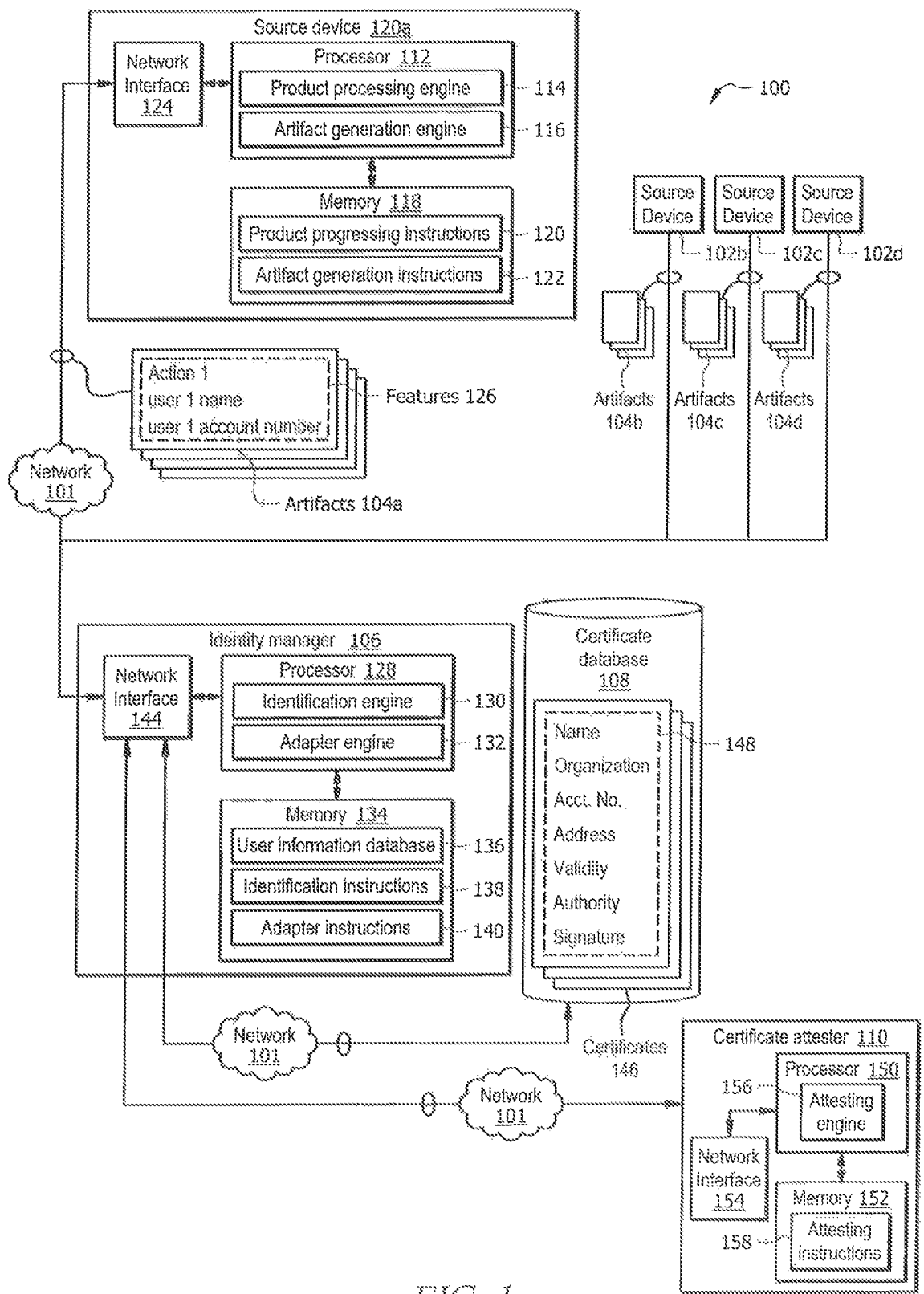
FIG. 1 is a schematic diagram of an embodiment of a system for identifying a certificate using natural language processing, in accordance with certain embodiments.
Figure 3:
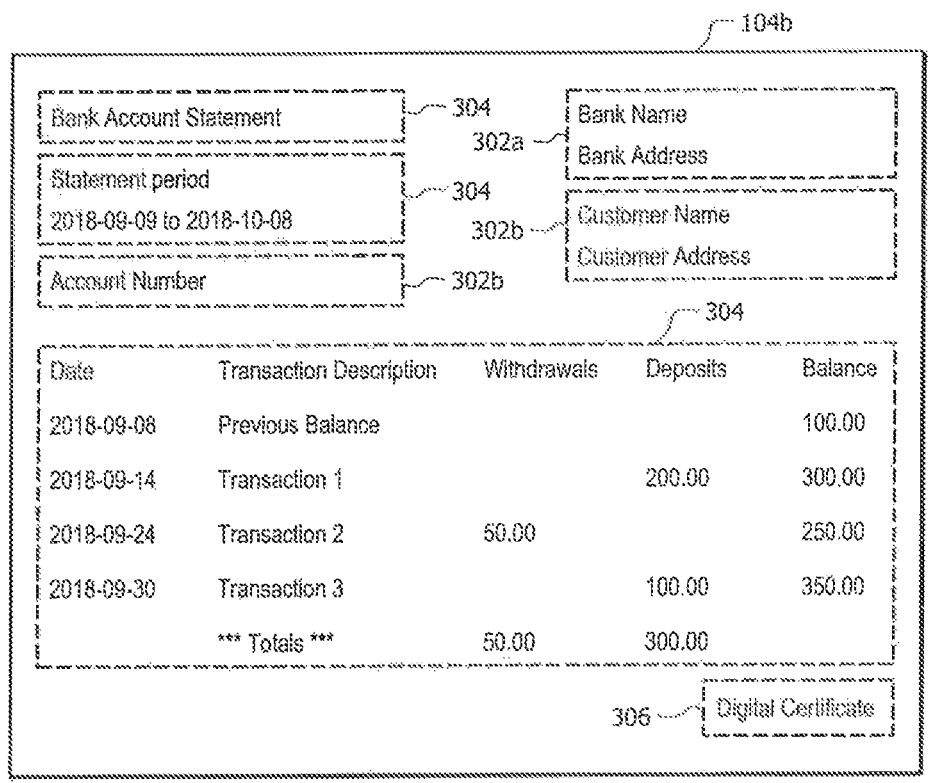
FIG. 3 is an embodiment of an example artifact generated by the source device without a signatory, in accordance with certain embodiments.
Figure 4:
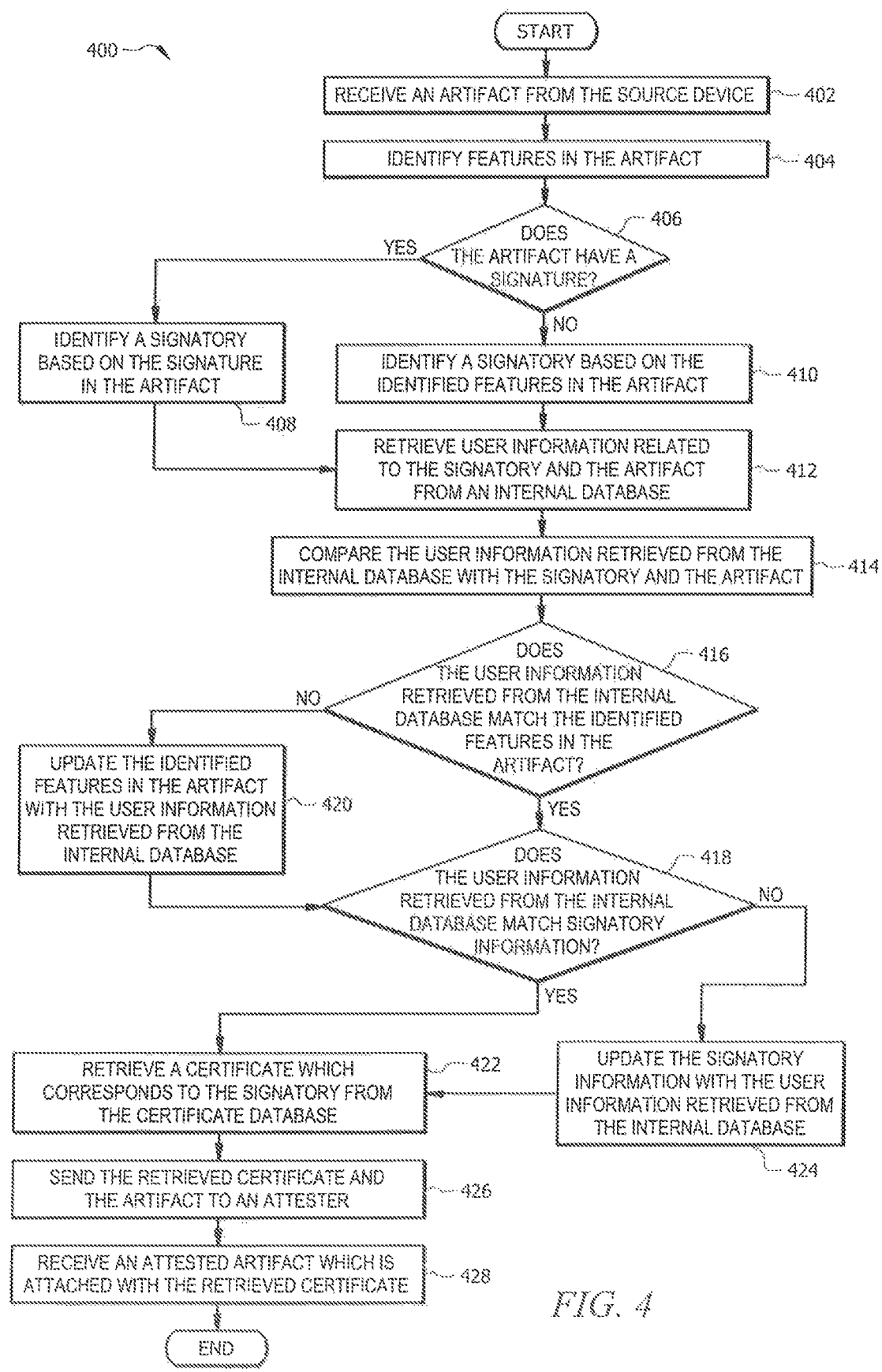
FIG. 4 is a flowchart of an embodiment of an identification engine for identifying a certificate corresponding to the artifact received from the source device, in accordance with certain embodiments.

FIG. 1 is an example of a system for certificate identification using natural language processing. FIG. 2 is an example of an artifact generated by a source device with a signatory. FIG. 3 is an example of an artifact generated by a source device without a signatory. FIG. 4 is an example of an identification engine for identifying a certificate corresponding to the artifact received from the source device.

FIG. 1 is a schematic diagram of an embodiment of a system 100 for certificate identification using natural language processing, according to certain embodiments. The system 100 comprises multiple source devices 102a-d, an identity manager 106, and a certificate database 108 in signal communication via a network 101. For example, the identity manager 106 may receive documents sent from a source device 102a and retrieve a corresponding certificate for each document from the certificate database 108 using a network connection. In certain embodiments, the system 100 may further comprises a certificate attester 110 in signal communication with the identity manager 106 via the network 101. The certificate attester 110 may be a server that belongs to a third-party entity or an attester engine implemented in the identity manager 106. In certain embodiments, the identity manager 106 may communicate with the source devices 102a-d, the certificate database 108, and the certificate attester 110.

The source device 102a generates an artifact 104a based on a request from a user or a routine project, such as a transaction or a monthly statement, and sends the artifact 104a to the identity manager 106. The identity manager 106 is configured to receive one or more artifacts 104a-d from the source devices 102a-d, to identify a signatory based on the artifact 104a, and to retrieve a certificate 146 corresponding to the signatory from the certificate database 108 using a processor 128. Furthermore, the identity manager 106 is configured to send the artifact 104a and the certificate 146 to the certificate attester 110. The certificate attester 110 is configured to receive the certificate 146 and the artifact 104a, and to attach the certificate 146 to the artifact 104a.

The network 101 is any suitable type of network operable to support wired and/or wireless communication between components of the system 100. For example, the network 101 may include all or a portion of the Internet, a public switched telephone network (PSTN), a public network, a private network, a local area network (LAN), a metropolitan area network (MAN), a wide area network (WAN), or any other suitable type of network. The network 101 may be configured to support any suitable type of communication protocol as would be appreciated by one of ordinary skill in the art upon viewing this disclosure.

In FIG. 1, the source device 102a comprises a processor 112, a memory 118, and a network interface 124. The network interface 124 may be configured as shown or in any other suitable configuration. The processor 112 comprises one or more processors operably coupled to the memory 116. The processor 114 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 112 may be a programmable logic device, a microcontroller, a microprocessor, or any suitable combination of the preceding. The processor 112 is communicatively coupled to and in signal communication with the memory 118. The one or more processors are configured to process data and may be implemented in hardware or software. For example, the processor 112 may be 8-bit, 16-bit, 32-bit, 64-bit or of any other suitable architecture. The processor 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement a product processing engine 114, and an artifact generation engine 116. In this way, the processor 112 may be a special purpose computer designed to implement function disclosed herein. In one embodiment, the product processing engine 114 and the artifact generation engine 116 are each implemented using logic units, FPGAs, ASICs, DSPs, or any other suitable hardware.

The memory 118 comprises one or more disks, tape drives, or solid-state drives, and may be used as an over-flow data storage device, to store programs when such programs are selected for execution, and to store instructions and data that are read during program execution. The memory 118 may be volatile or non-volatile and may comprise read-only memory (ROM), random-access memory (RAM), ternary content-addressable memory (TCAM), dynamic random-access memory (DRAM), and static random-access memory (SRAM). The memory 118 is operable to store product processing instructions 120, artifact generation instructions 122, and/or any other data or instructions. The product processing instructions 120 and the artifact generation instructions 122 may comprise any suitable set of instructions, logic, rules, or code operable to execute the product processing engine 114 and the artifact generation engine 116, respectively.

In certain embodiments, the source device 102a may generate an artifact 104a a based on a request received from a user to initiate a transaction between two accounts in a handwritten note. The artifact 104a may be handwritten note comprising account information of the two accounts, transaction information, and a handwritten signature of the user. The artifact 104a is further described in FIG. 2. The source device 102a may generate an artifact 104a based on the handwritten note by scanning the handwritten note and saving it as a .png file or a .jpg file, in order to send the artifact 104a to an identity manager 106 for certificate identification which is further described in FIGS. 2-4. The artifact 104a may comprise multiple features 126 indicating user data and an action. For example, the user data may comprise the account information of the two accounts and the handwritten signature of the user, and the action may be the transaction indicated in the transaction information.

In certain embodiments, the source device 102b may generate an artifact of a statement based on a default setting of the system 100, for example, generating the statement for each account monthly, in a .doc file or a .pdf file. The artifact 104b may comprise multiple features 126 indicating user data and an action which are further described in FIG. 3. For example, the user data may comprise the account information and the entity information, and the action may be a monthly statement indicating each transaction made in this month. In certain embodiments, the feature 126 may comprise a format for the artifact 104b.

The network interface 124 is configured to enable wired and/or wireless communications. The network interface 124 is configured to communicate data between the source devices 102a-d and the identity manager 106 in the system 100 and/or any other system or domain. For example, the network interface 124 may comprise a WIFI interface, a local area network (LAN) interface, a wide area network (WAN) interface, a modem, a switch, or a router. The processor 112 is configured to send and receive data using the network interface 124. The network interface 124 may be configured to use any suitable type of communication protocol as would be appreciated by one of ordinary skill in the art.

In FIG. 1, the product processing engine 114 and the artifact generation engine 116 are as shown as being implemented in a single source device 102. In other examples, the product processing engine 114 and the artifact generation engine 116 may be implemented by any suitable number of servers implemented using distributed network nodes. In certain embodiments, the product processing engine 114 and the artifact generation engine 116 may be implemented at a terminal device, such as a user device.

In FIG. 1, the identity manager 106 comprises a processor 128, a memory 134, and a network interface 144. The network interface 144 may be configured as shown or in any other suitable configuration. The processor 128 comprises one or more processors operably coupled to the memory 134. The processor 128 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 128 may be a programmable logic device, a microcontroller, a microprocessor, or any suitable combination of the preceding. The processor 128 is communicatively coupled to and in signal communication with the memory 134. The one or more processors are configured to process data and may be implemented in hardware or software. For example, the processor 128 may be 8-bit, 16-bit, 32-bit, 64-bit or of any other suitable architecture. The processor 128 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement an identification engine 130 and an adapter engine 132. In this way, the processor 128 may be a special purpose computer designed to implement the functions disclosed herein. In one embodiment, the identification engine 130 and the adapter engine 132 are each implemented using logic units, FPGAs, ASICs, DSPs, or any other suitable hardware.

The memory 134 comprises one or more disks, tape drives, or solid-state drives, and may be used as an over-flow data storage device, to store programs when such programs are selected for execution, and to store instructions and data that are read during program execution. The memory 134 may be volatile or non-volatile and may comprise read-only memory (ROM), random-access memory (RAM), ternary content-addressable memory (TCAM), dynamic random-access memory (DRAM), and static random-access memory (SRAM). The memory 134 is operable to store identification instructions 138, adapter instructions 140, and/or any other data or instructions. The memory 134 also comprises a user information database 136 operable to store user information related to the artifacts 104a-d and the certificates 146. For example, when the institution intends to make a change to the user information related to the artifact 104, such as a form for generating a statement or a signatory to sign an invoice, the user information in the user information database 136 at the identity manager 106 may be updated, instead of updating all of the source devices 102a-d respectively. The identification instructions 138 and the adapter instructions 140 may comprise any suitable set of instructions, logic, rules, or code operable to execute the identification engine 130 and the adapter engine 140. An identification method performed by the identification engine 130 is further described in FIG. 4. An adapter method performed by the adapter engine 132 is further described in FIG. 3.

The network interface 144 is configured to enable wired and/or wireless communications. The network interface 144 is configured to communicate data between the source devices 102a-d, the identity manager 106, the certificate database 108, and the certificate attester 110 in the system 100 and/or any other system or domain. For example, the network interface 144 may comprise a WIFI interface, a local area network (LAN) interface, a wide area network (WAN) interface, a modem, a switch, or a router. The processor 128 is configured to send and receive data using the network interface 144. The network interface 144 may be configured to use any suitable type of communication protocol as would be appreciated by one of ordinary skill in the art.

In FIG. 1, the identification engine 130 and the adapter engine 132, and the user information database 134 are as shown as being implemented in a single server device, i.e. the identity manager 106. In other examples, the identification engine 130 and the adapter engine 132, and the user information database 134 may be implemented by any suitable number of servers implemented using distributed network nodes.

In FIG. 1, the certificate database 108 stores multiple certificates 146, in which each certificate 146 comprises one or more fields comprising user identity information 148 corresponding to a signatory. In certain embodiments, the certificate database 108 may be a third-party authority which validates, issues and stores digital certificates for an entity or a user under certain provisions or regulations. The user identity information 148 in the fields in the certificate 146 may comprise, but is not limited to, a name of a user/entity, an organization's name, an address, a country, a validity period, a digital signature, and a public key of a user/entity. In certain embodiments, the certificate database 108 may be an internal database in the identity manager 106. In certain embodiments, the certificate database 108 may be a single external storage device (e.g., disks, solid-state drives).

In FIG. 1, the certificate attester 110 comprises a processor 150, a memory 152, and a network interface 154. The network interface 154 may be configured as shown or in any other suitable configuration. The processor 150 comprises one or more processors operably coupled to the memory 152. The processor 150 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 150 may be a programmable logic device, a microcontroller, a microprocessor, or any suitable combination of the preceding. The processor 150 is communicatively coupled to and in signal communication with the memory 152. The one or more processors are configured to process data and may be implemented in hardware or software. For example, the processor 150 may be 8-bit, 16-bit, 32-bit, 64-bit or of any other suitable architecture. The processor 150 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement an attesting engine 156. In this way, the processor 150 may be a special purpose computer designed to implement the functions disclosed herein. In one embodiment, the attesting engine 156 is implemented using logic units, FPGAs, ASICs, DSPs, or any other suitable hardware.

The memory 152 comprises one or more disks, tape drives, or solid-state drives, and may be used as an over-flow data storage device, to store programs when such programs are selected for execution, and to store instructions and data that are read during program execution. The memory 152 may be volatile or non-volatile and may comprise read-only memory (ROM), random-access memory (RAM), ternary content-addressable memory (TCAM), dynamic random-access memory (DRAM), and static random-access memory (SRAM). The memory 152 is operable to store attesting instructions 158, and/or any other data or instructions. The attesting instructions 158 may comprise any suitable set of instructions, logic, rules, or code operable to execute the attesting engine 156. In certain embodiments, the certificate attester 110 may receive the artifact 104a and the certificate 146 from the identity manager 106, in which the certificate 146 is retrieved from the certificate database 108 by the identity manager 106 based on the artifact 104a received from the source device 102a. The certificate attester 110 may identify that the features 126 in the artifact 104a correspond to the user identity information 148 in the certificate 146. When the features 126 in the artifact 104a correspond to the user identity information 148 in the certificate 146, the certificate attester 110 may attach the certificate 146 to the artifact 104a, and send the artifact 104a which is attached with the certificate 146 to the identity manager 106. In certain embodiments, the certificate attester 110 may be a certificate authority or be implemented at a server of the certificate authority. In the case of a certificate comprising a public key generated by a user, the certificate attester 110 may verify the public key of the certificate 146, encrypt the certificate 146 using a private key of the certificate attester 110, and then attach the retrieved certificate to the artifact 104a. The public key may be created by cryptographically secure pseudorandom number generator (CSPRNG) or any other suitable random number generator. In certain embodiments, the certificate attester 110 may send the artifact 104a attached with the certificate 146 to the source device 102a or a corresponding terminal device directly.

The network interface 154 is configured to enable wired and/or wireless communications. The network interface 154 is configured to communicate data between the identity manager 106 and the certificate attester 110 in the system 100 and/or any other system or domain. For example, the network interface 154 may comprise a WIFI interface, a local area network (LAN) interface, a wide area network (WAN) interface, a modem, a switch, or a router. The processor 150 is configured to send and receive data using the network interface 154. The network interface 154 may be configured to use any suitable type of communication protocol as would be appreciated by one of ordinary skill in the art.

Certificate Identifying Process for an Artifact with a Signatory

FIG. 2 illustrates an embodiment of an example artifact 104 generated by a source device 102 with a signatory, according to certain embodiments. For example, the artifact 104a may be an image or a document generated by the source device 102a based on a handwritten note from a user.

The identity manager 106 receives the artifact 104a from the source device 102a via the network interface 144. The identification engine 130 at the identity manager 106 starts to identify the features 126 in the artifact 104a using natural language processing. In certain embodiments, the features in the artifact 104a comprise contexts or graphics. The contexts may be alphabetical or numeral wordings, and the graphics may be a written signature or instructions. In certain embodiments, the features in the artifact 104a identified by the identification engine 130 may comprise user data 202a, 202b and an action 204. The natural language processing identifies contexts and graphics in the artifact using a combination of user-defined terms, artificial intelligence (AI)-defined terms, and any other suitable type of defined terms. The natural language processing system uses user-defined terms to indicate that a wording contains concepts that a user has previously identified. The natural language processing system uses AI-defined terms to indicate that a wording contains concepts that the natural language processing system has observed frequently in the artifacts. For example, the identification engine 130 identifies that the action 204 is a fund transfer from a customer to a beneficiary based on the contexts in the artifact 104a. The identification engine 130 also identifies customer account information based on the identified user data 202a and beneficiary account information based on the identified user data 202b. The identification engine 130 determines a signatory 206 based on a signature in the artifact 104a. In certain embodiments, the signature may be a graphic of a handwritten name, a digital signature, and/or any suitable type of signature.

In certain embodiments, the identification engine 130 may further confirm the signatory 206 based on the customer account information indicated in the user data 202a. For example, the customer account information in the user data 202a may comprise a customer's first name and last name, the identification engine 130 may compare the customer's first name and last name with the handwritten name which represents the signatory 206. When the customer's first name and last name matches the handwritten name, the identification engine 130 may confirm the signatory 206 of the artifact 104a. In certain embodiments, the identification engine 130 may select a second recognition technology to identify the artifact 104a to recognize any other features 126. For example, the identification engine 130 may identify the contexts in the artifact 104a using the second recognition technology to confirm the action 204 and the signatory 206 in the artifact 104a. The second recognition technology may recognize the term of "fund transfer" to confirm that the action is to transfer a fund. Therefore, the signatory 206 is the customer who initiates the fund transfer, instead of the beneficiary. In certain embodiments, the second recognition technology may be any recognition technologies different from the natural language processing, such as recognition of machine-printed texts (OCR), hand-printed texts (ICR), recognition of optical marks (OMR), and recognition of barcodes (OBR). In certain embodiments, the second recognition technology may be OCR configured to identify objects, object features, text, and/or logos. The OCR employs any suitable technique for implementing object and/or text recognition as would be appreciated by one of ordinary skill in the art upon viewing this disclosure. After identifying the signatory based on the signature in the artifact 104a, the identification engine 130 may proceed to step 412.

The identification engine 130 may further retrieve a certificate 146 corresponding to the signatory 206 from the certificate database 108 based on the signatory 206 which is identified by the handwritten signature and/or the texts in the artifact 104*a*.

Certificate Identifying Process for an Artifact without a Signatory

FIG. 3 is an embodiment of an example artifact 104 generated by a source device 102 without a signatory, according to certain embodiments. For example, the artifact 104*b* may be an image or a document generated by the source device 102*b* based on a routine action, such as a monthly statement.

The identity manager 106 receives the artifact 104*b* from the source device 102*a* via the network interface 144. The identification engine 130 at the identity manager 106 starts to identify the features in the artifact 104*b* using natural language processing. In certain embodiments, the features in the artifact 104*b* comprise contexts and terms indicating user data 302*a* and an action 304*b*. The contexts and terms may be alphabetical or numeral wordings. In certain embodiments, the identified contexts and terms indicating the action 304 may comprise "account statement", "statement period", and multiple transactions within the statement period. Therefore, the identification engine 130 may determine that a branch manager is a signatory to the artifact 104*b* because the identification engine 130 identifies that the action 304 is a monthly statement generated by an institution to a customer based on the contexts and terms identified in the artifact 104*b*. Furthermore, the identification engine 130 may identify entity information, such as a bank address and IBAN number of a bank, based on the identified user data 302*a* to re-confirm the identified signatory of the artifact 104*b*. In certain embodiments, the signatory may comprise signatory information which includes, but is not limited to, a title of the signatory, a digital signature of the signatory, and an address of the signatory. For example, when the address of the signatory matches the address in the entity information in identified user data 302*a*, the identification engine 130 may re-confirm that the signatory is correct for the artifact 104*b*. In certain embodiments, the identification engine 130 may further identify customer information based on the identified user data 302*b* to determine a recipient of the artifact 104*b*. After the identification engine 130 determines that a branch manager of the bank is a signatory to the artifact 104*b* based on the action 304 and the user data 302*a*, the identification engine 130 may retrieve a certificate 146 corresponding to the signatory from the certificate database 108.

In certain embodiments, the adapter engine 132 may identify a location 306 on the artifact 104*b* for attaching the certification 146 retrieved from the certificate database 108. For example, the location 306 may be in the last line of the artifact 104*b*.

Certificate Identifying Process at Identification Engine

FIG. 4 a flowchart of an embodiment of an identification engine 130 for identifying a certificate 146 corresponding to the artifact 104 received from the source device 102, according to certain embodiments. An identification process 400 for identifying a certificate 146 corresponding to the artifact 104*a* starts at step 402 with receiving an artifact 104*a* from a source device 102*a*.

At step 404, the identification engine 130 identifies features 126 in the artifact 104*a* using natural language processing. In certain embodiments, the feature 126 may comprise contexts or graphics. The contexts may be alphabetical or numeral wordings and the graphics may a written signature or handwritten instructions. In certain embodiments, the features 126 may indicate user data and an action based on the identified contexts or graphics. In certain embodiments, the feature 126 may indicate a format of the artifact 104*a*.

At step 406, the identification engine 130 determines whether the artifact 104*a* has a signature. In certain embodiments, the identification engine 130 may determine whether the artifact 104*a* comprises a signature based on the identified contexts or graphics. The identification engine 130 proceeds to step 408 in response to determining that the artifact 104*a* has a signature. The identification engine 130 proceeds to step 410 in response to determining that the artifact 104*a* does not have a signature.

At step 408, the identification engine 130 identifies a signatory based on the signature in the artifact 104*a*. In certain embodiments, the identification engine 130 may use a second recognition technology to identify new features 126 in the artifact 104*a*. For example, the identification engine 130 may identify the contexts in the artifact 104*a* using the second recognition technology to re-confirm that that signatory corresponds to the artifact 104*a*.

At step 410, the identification engine 130 identifies a signatory based on the identified features 126 in the artifact 104*a*. In certain embodiments, the signatory may be identified based on an action and in the identified features 126. For example, the action may be a monthly statement which is indicated by identified contexts and terms, such as "account statement", "statement period", and multiple transactions within the statement period, so that the identification engine 130 may determine that a branch manager of the bank is the signatory to the artifact 104*a*. In another example, the action may be a fund transfer, therefore, the signatory may be the customer who initiates the fund transfer. In certain embodiments, the signatory may be identified based on the user data in the identified features 126. For example, the user data in the identified features 126 may indicate entity information, such as a full name of a representative of the bank, a bank address, and IBAN number of a bank, the identification engine 130 may determine that the representative of the bank may be the signatory to the artifact 104*a*. In certain embodiments, the signatory may comprise signatory information, such as a title of the signatory, a digital signature of the signatory, and a registration number of the signatory.

At step 412, the identification engine 130 retrieves user information related to the signatory and the artifact 104*a* from an internal database in the identity manager 106. In certain embodiments, the internal database may be a user information database 136. In certain embodiments, the user information database 136 may be an internal database at the identity manager 106. The user information stored at the user information database 136 may be periodically updated by a user. In certain embodiments, the user information may comprise a user's legal full name, a user's account number, and a user's profile. In certain embodiments, the user information may comprise a format of a document which is used to generate an artifact 104*a*. For example, the identification engine 130 may retrieve a latest form for a monthly statement from the user information database 136. In certain embodiments, the user information may be information related to the signatory which includes, but is not limited to, a full name of the signatory, a digital signature of the signatory, a title of the signatory, and a registration number of the signatory.

At step 414, the identification engine 130 compares the user information retrieved from the user information database 136 with the signatory and the artifact 104*a*. For example, the identification engine 130 may compare the format of the artifact 104a with the latest form for generating the artifact 104a retrieved from the user information database 136. In one embodiment, the identification engine 130 may compare signatory information of the signatory with the user information related to the signatory retrieved from the user information database 136.

At step 416, the identification engine 130 determines whether the user information retrieved from the internal database 136 matches the identified features 126 in the artifact 104a. In certain embodiments, the identification engine 130 determines whether the user information retrieved from the internal database 136 match the identified features 126 in the artifact 104a based on the comparison performed at step 414. The identification engine 130 proceeds to step 418 in response to determining that the user information retrieved from the internal database 136 matches the identified features 126 in the artifact 104a. The identification engine 130 proceeds to step 420 in response to determining that the user information retrieved from the internal database does not match the identified features 126 in the artifact 104a. For example, the format of the artifact 104a matches the latest form for generating the artifact 104a retrieved from the user information database 136, the identification engine 130 may proceed to step 418. On the other hand, if the format of the artifact 104a does not match the latest form for generating the artifact 104a retrieved from the user information database 136, the identification engine 130 may proceed to step 420.

At step 418, the identification engine 130 determines whether the user information retrieved from the internal database 136 matches the signatory information of the signatory. The identification engine 130 proceeds to step 422 in response to determining that the user information retrieved from the internal database 136 matches the signatory information of the signatory. The identification engine 130 proceeds to step 424 in response to determining that the user information retrieved from the internal database does not match the signatory information of the signatory. For example, the title in the signatory information in the artifact 104a matches the title of the signatory in the user information retrieved from the user information database 136, the identification engine 130 may proceed to step 422. On the other hand, if the title in the signatory information in the artifact 104a does not match the title of the signatory in the user information retrieved from the user information database 136, the identification engine 130 may proceed to step 424.

At step 420, the identification engine 130 updates the identified features 126 in the artifact 104a with the user information retrieved from the user information database 136. For example, the format of the artifact 104a does not match the latest form for generating the artifact 104a, the identification engine 130 may update the artifact 104a with the latest form retrieved from the user information database 136. After updating the identified features 130 in the artifact 104a, the identification engine 130 may proceed to step 418.

At step 422, the identification engine 130 retrieves a certificate 146 which corresponds to the signatory from the certificate database 108. The certificate 146 comprises multiple fields indicating user identity information 148. The user identity information 148 corresponds to the signatory. In certain embodiments, the identification engine 130 may compare the identified features 126 in the artifact 104a which represents the signatory with the user identity information 148 which corresponds to the signatory comprised in the retrieved certificate 146. In certain embodiments, the identification engine 130 may further identify that the identified features 126 in the artifact 104a match the user identity information 148 comprised in the retrieved certificate 146. In certain embodiments, the certificate 146 may further comprise a public key which is generated based on the user identity information 148 by a random number generator.

At step 424, the identification engine 130 updates the signatory information of the signatory in the artifact 104a with the user information retrieved from the user information database 136. For example, the title of the signatory is "associate" in the artifact 104a, and the title of the signatory retrieved from the user information database 136 is "senior associate", the identification engine 130 may update the title of senior associate for the signatory in the artifact 104a. In another embodiment, the signatory who is the representative of the bank, in the artifact 104a may have been changed recently, the identification engine 130 may update the signatory with the current, most updated representative of the bank retrieved from the user information database 136. After updating the signatory information of the signatory in the artifact 104a, the identification engine 130 may proceed to step 422.

At step 426, the identification engine 130 sends the retrieved certificate 146 and the artifact 104a to a certificate attester 110. In certain embodiments, the certificate attester 110 may be a third-party certificate authority. In certain embodiments, the certificate attester 110 may be implemented at the identity manager 106. The certificate attester 110 may be configured to receive the retrieved certificate 146 and the artifact 104a, identify that the identified features 126 in the artifact 104a correspond to the user identity information 148 in the retrieved certificate 146; and attach the retrieved certificate 146 to the artifact 104a. In certain embodiments, the certificate attester 110 may verify that the public key, which is generated based on the user identity information 148 by the random number generator, in the retrieved certificate 146 corresponds to the user identity information in the fields of the retrieved certificate 146, encrypt the retrieved certificate 146 using a private key of the certificate attester 110, and attach the retrieved certificate 146 to the artifact 104a. In certain embodiments, the identification engine 130 may attach the retrieved certificate 146 to the artifact 104b.

At step 428, the identification engine 130 receives an attested artifact 104a which is attached with the retrieved certificate 146. In certain embodiments, the identification engine 130 may further forward the attested artifact 104a to the source device 102a to perform the action in the artifact 104a. In certain embodiments, the identification engine 130 may forward the attested artifact 104a to an assigned device directly to perform the action in the artifact 104a, for example, a server or a user equipment.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A certificate identification system comprising:
   one or more source devices comprising a processor configured to generate an artifact, wherein the artifact comprises features indicating user data and an action;
   a certificate database configured to store certificates, wherein each of the certificates comprises one or more fields comprising user identity information corresponds to a signatory; and
   an identity manager in signal communication with the one or more source devices and the certificate database, comprising an identification engine configured to:
   receive the artifact from a source device of the one or more source devices;
   identify the features in the artifact using natural language processing;
   determine a signatory based on the identified features in the artifact;
   retrieve a certificate corresponding to the signatory from the certificate database;
   compare the identified features in the artifact which represents the signatory with the user identity information which corresponds to the signatory comprised in the retrieved certificate;
   identify that the identified features in the artifact match the user identity information comprised in the retrieved certificate; and
   attach the retrieved certificate to the artifact.

2. The system according to claim 1, wherein the identity manager further comprises an internal database which is configured to store user information related to signatories and the artifacts, wherein the identification engine is further configured to:
   retrieve user information related to the signatory and the artifact from the internal database;
   compare the user information with signatory information of the signatory and the artifact;
   identify whether the user information matches the signatory information of the signatory and the identified features in the artifact; and
   update the signatory information of the signatory and the identified features in the artifact with the user information from the internal database when the user information does not match the signatory information of the signatory and the identified features in the artifact.

3. The system according to claim 1, further comprising an attester configured to attach the retrieved certificate to the artifact, wherein the attester is configured to:
   receive the retrieved certificate and the artifact;
   identify that the identified features in the artifact correspond to the user identity information in the retrieved certificate; and
   attach the retrieved certificate to the artifact.

4. The system according to claim 3, wherein the retrieved certificate further comprises a public key generated based on the user identity information.

5. The system according to claim 4, wherein the attester is a certificate authority, wherein the certificate authority verifies that the public key matches the user identity information in the at least one field of the retrieved certificate, encrypts the retrieved certificate using a private key of the certificate authority, and attaches the retrieved certificate to the artifact.

6. The system according to claim 1, wherein the identity manager further comprises an adapter engine configured to identify a location for attaching the retrieved certificate in the artifact.

7. The system according to claim 1, wherein the certificate database is implemented in the internal database of the identity manager.

8. The system according to claim 1, wherein the features comprise contexts or graphics, wherein the contexts are alphabetical or numeral wordings and the graphics are a written signature or instructions.

9. A server for identifying a certificate comprising:
   an identification engine implemented by a hardware processor and configured to identify a certificate for an artifact by:
   receiving the artifact from a source device, wherein the artifact comprises features indicating user data and an action;
   identifying the features in the artifact by natural language processing;
   determining a signatory based on the identified features;
   retrieving a certificate corresponding to the signatory from a certificate database, wherein the certificate database stores certificates, each of the certificates comprises one or more fields comprising user identity information corresponds to a signatory;
   comparing the identified features in the artifact which represents the signatory with the user identity information which corresponds to the signatory comprised in the retrieved certificate;
   identifying that the identified features in the artifact match the user identity information comprised in the retrieved certificate; and
   attaching the retrieved certificate to the artifact.

10. The server according to claim 9, wherein the server further comprises an internal database which is configured to store user information related to signatories and the artifacts, wherein the identification engine is further configured to:
    retrieve user information related to the signatory and the artifact from the internal database;
    compare the user information with signatory information of the signatory and the artifact;
    identify whether the user information matches the signatory information of the signatory and the identified features in the artifact; and
    update the signatory information of the signatory and the identified features in the artifact with the user information from the internal database when the user information does not match the signatory information of the signatory and the identified features in the artifact.

11. The server according to claim 9, wherein the retrieved certificate further comprises a public key generated based on the user identity information.

12. The server according to claim 11, wherein the server is further configured to verify that the public key matches the user identity information in the at least one field of the retrieved certificate, encrypt the retrieved certificate using a private key of the server, and attach the retrieved certificate to the artifact.

13. The server according to claim 9, wherein the server further comprises an adapter engine configured to identify a location for attaching the certificate in the artifact.

14. The server according to claim 9, wherein the certificate database is implemented in an internal database of the server.

15. The server according to claim 9, wherein the features comprise contexts or graphics, wherein the contexts are alphabetical or numeral wordings and the graphics are a written signature or instructions.

16. A method for identifying a certificate comprising:
receiving an artifact from a source device, wherein the artifact comprises features indicating user data and an action;
identifying the features in the artifact by natural language processing;
determining a signatory based on the identified features;
retrieving a certificate corresponding to the signatory from a certificate database, wherein the certificate database stores certificates, each of the certificates comprises one or more fields comprising user identity information corresponds to a signatory;
comparing the identified features in the artifact which represents the signatory with the user identity information which corresponds to the signatory comprised in the retrieved certificate;
identifying that the identified features in the artifact match the user identity information comprised in the retrieved certificate; and
attaching the retrieved certificate to the artifact.

17. The method according to claim 16, further comprising:
retrieving user information related to the signatory and the artifact from a user information database;
comparing the user information with signatory information of the signatory and the artifact;
identifying whether the user information matches the signatory information of the signatory and the identified features in the artifact; and
updating the signatory information of the signatory and the identified features in the artifact with the user information from the user information database when the user information does not match the signatory information of the signatory and the identified features in the artifact.

18. The method according to claim 16, wherein the retrieved certificate further comprises a public key generated based on the user identity information, wherein the method further comprises verify that the public key matches the user identity information in the at least one field of the retrieved certificate, encrypt the retrieved certificate using a private key of an attester, and attach the retrieved certificate to the artifact.

19. The method according to claim 16, further comprising identifying a location for attaching the certificate in the artifact.

20. The method according to claim 16, wherein the features comprise contexts or graphics, wherein the contexts are alphabetical or numeral wordings and the graphics are a written signature or instructions.

\* \* \* \* \*